US010701875B2

(12) United States Patent
Klein et al.

(10) Patent No.: US 10,701,875 B2
(45) Date of Patent: Jul. 7, 2020

(54) MULTI-PIECE HYDROPONIC TOWER WITH HINGED TOWER FACE

(71) Applicant: MJNN, LLC, South San Francisco, CA (US)

(72) Inventors: Brice Klein, San Francisco, CA (US); Michael Flynn, Palo Alto, CA (US); Alexandre Le Roux, Menlo Park, CA (US); Matthew Matera, San Francisco, CA (US); Alex Ibrahim, Pacifica, CA (US)

(73) Assignee: MJNN, LLC, South San Francisco, CA (US)

( * ) Notice: Subject to any disclaimer, the term of this patent is extended or adjusted under 35 U.S.C. 154(b) by 311 days.

(21) Appl. No.: 15/968,425

(22) Filed: May 1, 2018

(65) Prior Publication Data

US 2019/0269079 A1    Sep. 5, 2019

Related U.S. Application Data

(63) Continuation-in-part of application No. 15/910,601, filed on Mar. 2, 2018.

(51) Int. Cl.
*A01G 31/02*  (2006.01)
*E05D 1/00*   (2006.01)
*F16B 7/04*   (2006.01)
*E05D 9/00*   (2006.01)

(52) U.S. Cl.
CPC .............. *A01G 31/02* (2013.01); *E05D 1/00* (2013.01); *E05D 9/005* (2013.01); *F16B 7/0433* (2013.01); *E05Y 2900/602* (2013.01)

(58) Field of Classification Search
CPC ........ A01G 9/047; A01G 9/025; A01G 9/022; A01G 9/023; A01G 31/04; A01G 31/06
See application file for complete search history.

(56) References Cited

U.S. PATENT DOCUMENTS

| | | | | |
|---|---|---|---|---|
| 1,709,860 A | * | 4/1929 | Lovett, Jr. ............... | A01G 9/026 47/73 |
| 3,896,587 A | * | 7/1975 | Insalaco ................. | A01G 9/021 47/65.5 |
| 4,033,072 A | * | 7/1977 | Kobayashi ............. | A01G 31/06 47/62 R |
| 4,454,684 A | * | 6/1984 | O'Hare .................. | A01G 9/022 47/82 |

(Continued)

FOREIGN PATENT DOCUMENTS

| CN | 204616518 U | 9/2015 |
|---|---|---|
| WO | WO 2017/109279 A1 | 6/2017 |

*Primary Examiner* — Magdalena Topolski
*Assistant Examiner* — Morgan T Barlow
(74) *Attorney, Agent, or Firm* — Patent Law Office of David G. Beck

(57) ABSTRACT

A multi-piece hydroponic tower utilizing separate tower body and face plate components that are hingeably coupled together, thereby simplifying tower construction as well as tower maintenance. In addition to the hinge, the tower face plate(s) is held in place with a latch, e.g., a snap-fit fastener. A V-shaped groove may be included on either side of the tower, the grooves increasing the efficiency of delivering water and nutrients to the plants via the narrowed rear cavity wall(s). The V-shaped grooves may also be used as an alignment aid when coupling planters, harvesters, or other equipment to the tower.

20 Claims, 5 Drawing Sheets

(56) References Cited

U.S. PATENT DOCUMENTS

| | | | | |
|---|---|---|---|---|
| 4,683,674 A * | 8/1987 | Faul | ............... | C05F 17/907 47/83 |
| 5,251,399 A * | 10/1993 | Rasmussen | ............... | A01G 9/023 211/88.03 |
| 5,363,594 A * | 11/1994 | Davis | ............... | A01G 9/022 47/82 |
| 5,555,676 A * | 9/1996 | Lund | ............... | A01G 9/022 47/82 |
| 5,913,477 A * | 6/1999 | Dean | ............... | A01G 9/12 239/289 |
| 5,918,416 A * | 7/1999 | Ammann, Jr. | ............... | A01G 31/02 47/58.1 R |
| 6,477,805 B2 * | 11/2002 | Ware | ............... | A01G 31/02 47/83 |
| 7,143,544 B2 * | 12/2006 | Roy | ............... | A01G 31/02 47/60 |
| 7,171,782 B2 * | 2/2007 | Felknor | ............... | A01G 9/0291 47/73 |
| 7,373,753 B1 * | 5/2008 | Caruso | ............... | A01G 9/027 211/182 |
| 8,250,804 B2 * | 8/2012 | Chang | ............... | A01G 9/025 47/39 |
| 8,365,466 B1 * | 2/2013 | Storey | ............... | A01G 31/06 47/62 C |
| 8,418,403 B1 * | 4/2013 | Nuttman | ............... | A01G 9/024 47/82 |
| 8,919,041 B2 * | 12/2014 | Topping | ............... | A01G 9/20 47/66.6 |
| 8,966,819 B1 * | 3/2015 | Cosmann | ............... | A01G 9/023 47/83 |
| 9,374,953 B2 * | 6/2016 | Martin | ............... | A01G 31/06 |
| 9,814,186 B2 * | 11/2017 | Anderson | ............... | A01G 31/06 |
| 10,123,494 B2 * | 11/2018 | Janssen | ............... | A01G 9/025 |
| 2003/0089037 A1 * | 5/2003 | Ware | ............... | A01G 9/025 47/83 |
| 2006/0156624 A1 * | 7/2006 | Roy | ............... | A01G 9/025 47/62 R |
| 2008/0078118 A1 * | 4/2008 | Bissonnette | ............... | A01G 9/0293 47/63 |
| 2009/0223126 A1 * | 9/2009 | Garner | ............... | E04F 13/083 47/66.7 |
| 2010/0146855 A1 * | 6/2010 | Ma | ............... | A01G 9/025 47/82 |
| 2011/0107667 A1 * | 5/2011 | Laurence | ............... | A01G 9/025 47/59 S |
| 2014/0130414 A1 * | 5/2014 | Storey | ............... | A01G 31/06 47/62 A |
| 2014/0290137 A1 * | 10/2014 | Nagels | ............... | A01G 31/06 47/62 R |
| 2015/0300011 A1 * | 10/2015 | Lopez Otamendi | ............... | E04B 2/86 52/27 |
| 2015/0313104 A1 * | 11/2015 | Cottrell | ............... | A01G 9/022 47/62 A |
| 2016/0066525 A1 * | 3/2016 | Duquesnay | ............... | A01G 31/06 47/62 R |
| 2016/0120141 A1 * | 5/2016 | Stolzfus | ............... | A01G 31/06 47/62 A |
| 2017/0055473 A1 * | 3/2017 | Baker | ............... | A01G 9/025 |
| 2017/0105372 A1 * | 4/2017 | Bryan, III | ............... | A01G 31/06 |
| 2017/0202164 A1 * | 7/2017 | Dufresne | ............... | A01G 31/06 |
| 2017/0238486 A1 * | 8/2017 | De Feo | ............... | A01G 31/02 |
| 2017/0339841 A1 * | 11/2017 | Monasterio | ............... | A01G 31/06 |
| 2018/0000029 A1 * | 1/2018 | Martin | ............... | A01G 31/02 |
| 2018/0007849 A1 * | 1/2018 | Cohen | ............... | A01G 31/02 |
| 2018/0042186 A1 * | 2/2018 | Kop | ............... | A01G 9/246 |
| 2018/0092314 A1 * | 4/2018 | McGuinness | ............... | A01G 27/005 |
| 2018/0213734 A1 * | 8/2018 | Smith | ............... | A01G 31/06 |
| 2018/0295800 A1 * | 10/2018 | Kiernan | ............... | A01G 31/06 |
| 2018/0310499 A1 * | 11/2018 | Van Buuren | ............... | A01G 9/022 |
| 2018/0325052 A1 * | 11/2018 | Gru | ............... | A01G 31/02 |
| 2019/0082617 A1 * | 3/2019 | Moffitt | ............... | A01G 7/02 |
| 2019/0082627 A1 * | 3/2019 | Moffitt | ............... | A01G 31/06 |
| 2019/0200551 A1 * | 7/2019 | Walters | ............... | A01G 31/02 |
| 2019/0269079 A1 * | 9/2019 | Klein | ............... | E05D 1/00 |
| 2019/0297787 A1 * | 10/2019 | Klein | ............... | A01G 9/022 47/82 |

\* cited by examiner

MULTI-PIECE HYDROPONIC TOWER WITH HINGED TOWER FACE

CROSS-REFERENCE TO RELATED APPLICATION

This application is a continuation-in-part of U.S. patent application Ser. No. 15/910,601, filed 2 Mar. 2018, the disclosure of which is incorporated herein by reference for any and all purposes.

FIELD OF THE INVENTION

The present invention relates generally to hydroponic growing systems and, more particularly, to a hydroponic tower that provides increased planting consistency, decreased manufacturing time and cost, and improved tower characteristics (e.g., strength, ease of cleaning, efficiency of use, etc.).

BACKGROUND OF THE INVENTION

Given the continued growth of the world's population, and given that the regions allocated for agricultural pursuits have decreased or simply become less favorable to such activities, the ability of conventional farms to feed the world's growing population has become increasingly taxed. Additionally, since population centers and agricultural centers are frequently not co-located, and due to the time and expense associated with shipping agricultural goods, in many regions of the world only the wealthy are able to obtain adequate supplies of non-processed food, i.e., raw fruits and vegetables. Furthermore, the fruits and vegetables that do reach population centers are likely to be of decreased nutritional content and flavor, both due to the distance that they have traveled and the fact that much of today's produce is bred for durability and fertility rather than flavor & nutrition. As a result, there has been a renewed interest in soilless growing techniques that do not require the use of pesticides, drastically reduce the use of water, and allow for growing varietals that are bred for nutrition and flavor instead of durability.

Hydroponics is a soilless growing technique in which plants are grown using a liquid solution of water and nutrients. The roots of the plants are typically maintained in a fibrous or granular material, often comprised of plastic, and fed via a wick, drip, nutrient film, or other nutrient delivery system. Hydroponic growing systems are often established within indoor facilities, thus allowing them to be located in or near population centers. This approach also provides exceptional climate control (i.e., temperature, humidity, air flow, $CO_2$ concentration, light wavelength, intensity and duration, etc.) as well as improved pest and disease control, thus allowing an indoor hydroponic farm to succeed in a region in which the outside environment and/or the soil conditions are inhospitable to the use of conventional farming techniques. Furthermore, hydroponic and other soilless growing techniques can yield extremely high plant densities, especially in those instances in which either horizontal stacking systems or vertical growth towers are used.

While hydroponic farming techniques offer a number of advantages over conventional farming techniques, in order to achieve large-scale adoption of these techniques it is vital that the cost per plant be competitive with the costs associated with conventional farming techniques. Accordingly, the present invention provides a hydroponic tower that achieves increased planting consistency, increased tower strength, decreased manufacturing time and cost, and simplified maintenance between use cycles.

SUMMARY OF THE INVENTION

The present invention provides a multi-piece hydroponic tower comprised of (i) a tower body that defines a first tower cavity, where the first tower cavity is configured to provide a passageway for a water/nutrient mix, and where a first edge portion of the tower body includes a first tower body hinge member; (ii) a first tower face plate, where an edge portion of the first tower face plate includes a first face plate hinge member, where the first tower face plate is hingeably coupled to the tower body via the first tower body hinge member and the first face plate hinge member, where the first tower face plate is positionable relative to the tower body in at least a first tower cavity closed position and a first tower cavity open position, and where the first tower face plate includes a first plurality of plant container cut-outs configured to accept a first plurality of plant containers; and (iii) a first fastener configured to temporarily latch the first tower face plate to the tower body when the first tower face plate is in the first tower cavity closed position. The first fastener may be comprised of a first plurality of fasteners. The first fastener may be comprised of a first snap-fit fastener. The tower body and the first tower face plate may be fabricated from plastic (e.g., polyethylene, polypropylene, polyvinyl chloride, polytetrafluoroethylene, and acrylonitrile butadiene styrene, etc.) and may be white.

The multi-piece hydroponic tower may be a dual-sided hydroponic tower, where the tower body defines a first tower cavity and a second tower cavity, where the first body hinge member of the first edge portion of the tower body corresponds to the first tower cavity, and where the tower body is further comprised of a second tower body hinge member corresponding to a second edge portion, the second tower body hinge member of the second edge portion of the tower body corresponding to the second tower cavity. The dual-sided hydroponic tower includes (i) a second tower face plate, where an edge portion of the second tower face plate includes a second face plate hinge member, where the second tower face plate is hingeably coupled to the tower body via the second tower body hinge member and the second face plate hinge member, where the second tower face plate is positionable relative to the tower body in at least a second tower cavity closed position and a second tower cavity open position, and where the second tower face plate includes a second plurality of plant container cut-outs configured to accept a second plurality of plant containers; and (ii) a second fastener configured to temporarily latch the second tower face plate to the tower body when the second tower face plate is in the second tower cavity closed position. The second fastener may be comprised of a second plurality of fasteners. The second fastener may be comprised of a second snap-fit fastener.

In a configuration in which the multi-piece hydroponic tower is a dual-sided hydroponic tower: (i) the first tower cavity may be comprised of a first side wall, a second side wall and a first rear cavity wall, where the first side wall flares out relative to the first rear cavity wall when the first tower face plate is positioned in the first tower cavity open position, and where the second side wall flares out relative to the first rear cavity wall when the first tower face plate is positioned in the first tower cavity open position; and (ii) the second tower cavity may be comprised of a third side wall, a fourth side wall and a second rear cavity wall, where the third side wall flares out relative to the second rear cavity wall when the second tower face plate is positioned in the second tower cavity open position, and where the fourth side wall flares out relative to the second rear cavity wall when the second tower face plate is positioned in the second tower cavity open position. In this configuration the first side wall is at an angle of approximately 100 degrees relative to the first rear cavity wall when the first tower face plate is positioned in the first tower cavity open position; the second side wall is at an angle of approximately 100 degrees relative to the first rear cavity wall when the first tower face plate is positioned in the first tower cavity open position; the third side wall is at an angle of approximately 100 degrees relative to the second rear cavity wall when the second tower face plate is positioned in the second tower cavity open position; and the fourth side wall is at an angle of approximately 100 degrees relative to the second rear cavity wall when the second tower face plate is positioned in the second tower cavity open position. In this configuration the first side wall is approximately perpendicular to the first rear cavity wall when the first tower face plate is positioned in the first tower cavity closed position; the second side wall is approximately perpendicular to the first rear cavity wall when the first tower face plate is positioned in the first tower cavity closed position; the third side wall is approximately perpendicular to the second rear cavity wall when the second tower face plate is positioned in the second tower cavity closed position; and the fourth side wall is approximately perpendicular to the second rear cavity wall when the second tower face plate is positioned in the second tower cavity closed position. In this configuration a first strain relief feature may be positioned at a first junction, where the first junction is formed between the first side wall and the first rear cavity wall; a second strain relief feature may be positioned at a second junction, where the second junction is formed between the second side wall and the first rear cavity wall; a third strain relief feature may be positioned at a third junction, where the third junction is formed between the first side wall and the second side wall; a fourth strain relief feature may be positioned at a fourth junction, where the fourth junction is formed between the third side wall and the second rear cavity wall; a fifth strain relief feature may be positioned at a fifth junction, where the fifth junction is formed between the fourth side wall and the second rear cavity wall; and a sixth strain relief feature may be positioned at a sixth junction, where the sixth junction is formed between the third side wall and the fourth side wall.

In a configuration in which the multi-piece hydroponic tower is a dual-sided hydroponic tower, the hydroponic tower may include (i) a first V-shaped groove running along the length of a first side of the tower body, where the first V-shaped groove is centered between the first tower cavity and the second tower cavity; and (ii) a second V-shaped groove running along the length of a second side of the tower body, where the second V-shaped groove is centered between the first tower cavity and the second tower cavity. In this configuration the first V-shaped groove may be formed from a first side wall portion corresponding to the first tower cavity and a second side wall portion corresponding to the second tower cavity, and the second V-shaped groove may be formed from a third side wall portion corresponding to the first tower cavity and a fourth side wall portion corresponding to the second tower cavity. In this configuration a first strain relief feature may be positioned at a first junction, where the first junction is formed between the first side wall portion and the first rear cavity wall; a second strain relief feature may be positioned at a second junction, where the second junction is formed between the second side wall portion and the first rear cavity wall; a third strain relief feature may be positioned at a third junction, where the third junction is formed between the first side wall portion and the second side wall portion; a fourth strain relief feature may be positioned at a fourth junction, where the fourth junction is formed between the third side wall portion and the second rear cavity wall; a fifth strain relief feature may be positioned at a fifth junction, where the fifth junction is formed between the fourth side wall portion and the second rear cavity wall; and a sixth strain relief feature may be positioned at a sixth junction, where the sixth junction is formed between the third side wall portion and the fourth side wall portion. In this configuration the first side wall portion is at an angle of between 90 and 110 degrees, and preferably at an angle of approximately 102 degrees, relative to the second side wall portion when the first tower face plate is in the first tower cavity closed position and the second tower face plate is in the second tower cavity closed position; and the third side wall portion is at an angle of between 90 and 110 degrees, and preferably at an angle of approximately 102 degrees, relative to the fourth side wall portion when the first tower face plate is in the first tower cavity closed position and the second tower face plate is in the second tower cavity closed position.

In a configuration in which the multi-piece hydroponic tower is a dual-sided hydroponic tower, the first rear cavity wall and the second rear cavity wall may each include a plurality of vertical ridges. The vertical ridges may be of uniform width.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. Additionally, the same reference label on different figures should be understood to refer to the same component or a component of similar functionality.

DESCRIPTION OF THE SPECIFIC EMBODIMENTS

As used herein, the singular forms "a", "an" and "the" are intended to include the plural forms as well, unless the context clearly indicates otherwise. The terms "comprises", "comprising", "includes", and/or "including", as used herein, specify the presence of stated features, process steps, operations, elements, and/or components, but do not preclude the presence or addition of one or more other features, process steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps, calculations, or components, these steps, calculations, or components should not be limited by these terms, rather these terms are only used to distinguish one step, calculation, or component from another. For example, a first calculation could be termed a second calculation, and, similarly, a first step could be termed a second step, and, similarly, a first component could be termed a second component, without departing from the scope of this disclosure.

Figure 1:
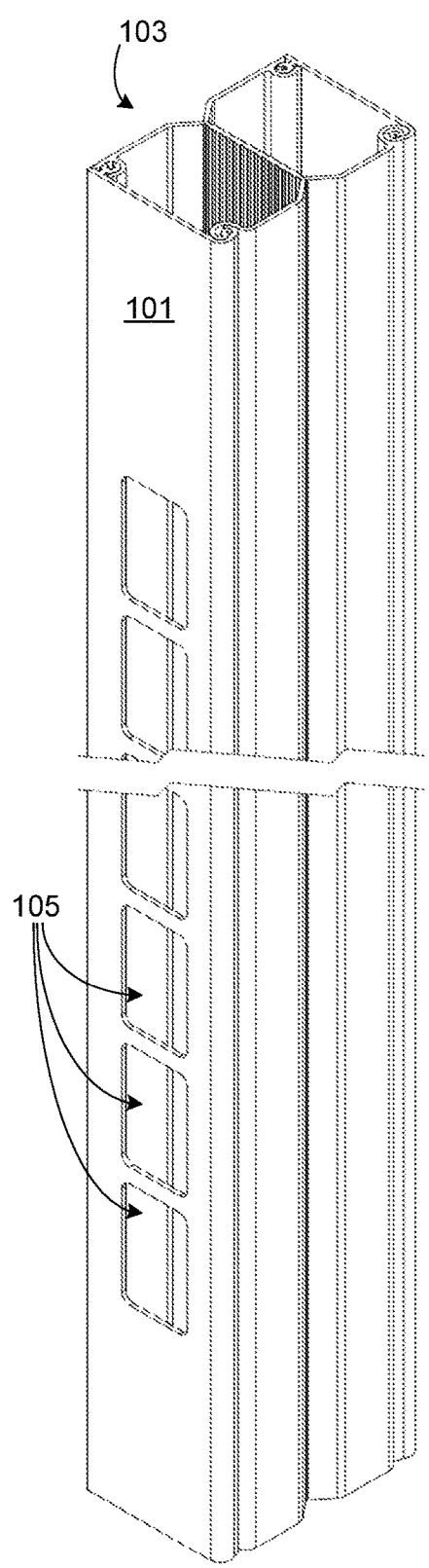
FIG. 1 provides a perspective view of an exemplary dual-sided, multi-piece hydroponic tower with hingeably coupled front face plates, this view showing the face plates in the closed position.
Figure 2:
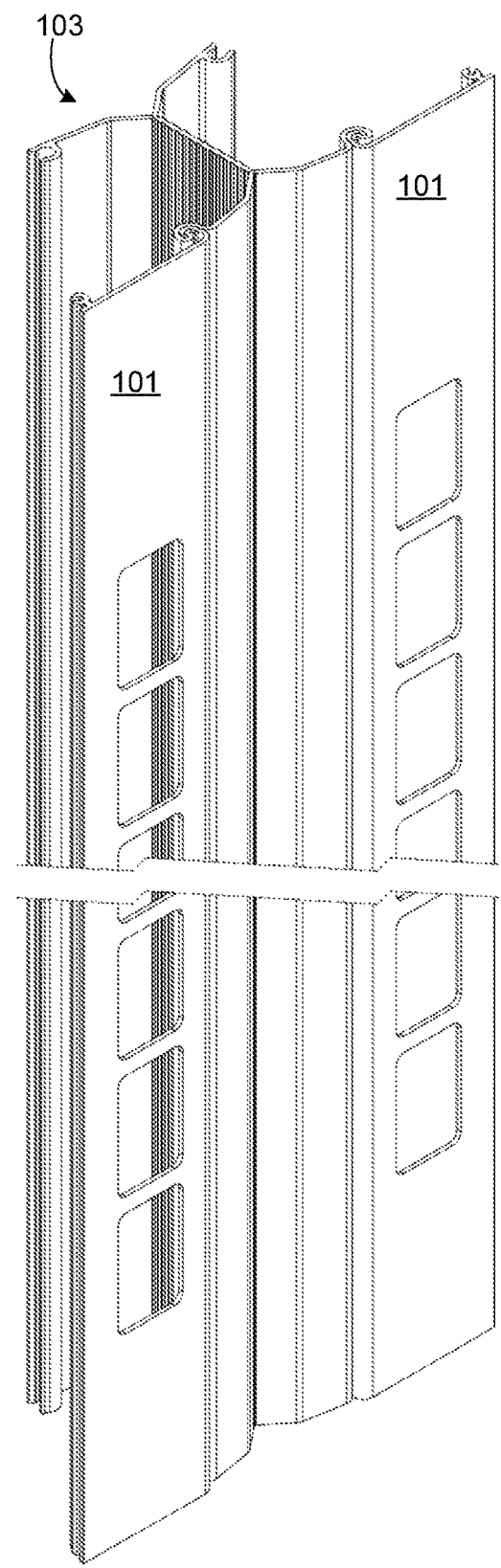
FIG. 2 provides a perspective view of the dual-sided, multi-piece hydroponic tower shown in FIG. 1, this view showing the face plates in the open position.
Figures 3, 4:
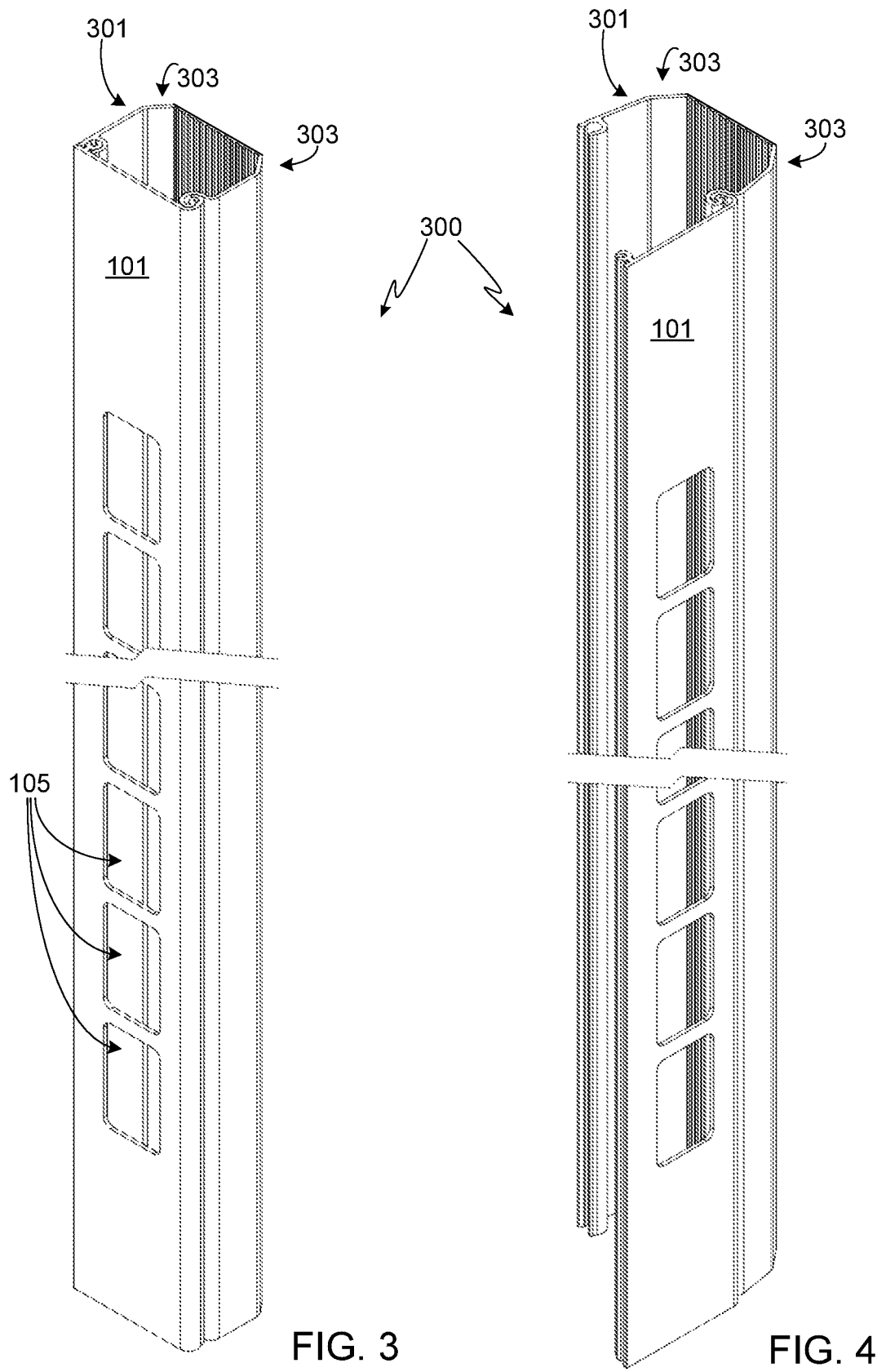
FIG. 3 provides a perspective view of an exemplary single-sided, multi-piece hydroponic tower with a hingeably coupled front face plate, this view showing the face plate in the closed position.
FIG. 4 provides a perspective view of the single-sided, multi-piece hydroponic tower shown in FIG. 3, this view showing the face plate in the open position.

FIG. 1 provides a perspective view of an exemplary dual-sided, multi-piece hydroponic tower 100 in which each front face plate 101 is hingeably coupled to the tower body 103. In FIG. 1 each front face plate 101 is in the closed position. FIG. 2 provides a perspective view of the same hydroponic tower 100 with both face plates 101 shown in the open position. Although the dual-sided configuration is preferred, the invention may also be utilized in a single-sided configuration as illustrated by tower 300 shown in FIGS. 3 and 4. Tower 300 is similar in design to that of tower 100 except that the tower body 301 only includes a single tower cavity.

In order to illustrate the tower design, towers 100 and 300 each include a plurality of cut-outs 105 for use with a compatible plant container such as the plant container disclosed in co-assigned and co-pending U.S. patent application Ser. No. 15/910,445, filed 2 Mar. 2018, the disclosure of which is incorporated herein for any and all purposes. It should be understood, however, that the multi-piece tower design disclosed in the present application is not limited to use with this particular plant container, rather the multi-piece hydroponic tower designs disclosed herein may be used with any suitably sized hydroponic plant container. As such, cut-outs 105 are only meant to illustrate, not limit, the present tower design and it should be understood that the present invention is equally applicable to other cut-out designs. It will be understood that the plant containers may be ultrasonically welded, bonded, or otherwise attached to tower face 101.

In a traditional hydroponic tower, the tower is extruded as a single piece. Due to the inclusion of the tower cavity, the extrusion process must operate at a relatively low rate in order to allow sufficient time for the heat contained within the tower cavity to be released. By separately manufacturing the body portion (e.g., dual-sided body portion 103 and single-sided body portion 301) of the hydroponic tower from the face plates, the heat generated during the extrusion process is no longer trapped within the tower body, thereby allowing the extrusion process to operate much more quickly, thereby lowering manufacturing costs. Additionally, by separating the tower body from the face plate, or face plates, the same body portion can be used with a variety of different face plates, face plates that may be configured for different plant containers, different cut-out designs, and/or different spacing between plants. This flexibility yields decreased manufacturing cost while providing additional value to the end customer (i.e., the grower). Lastly, separating the tower into a body portion and a face portion allows features such as the plant container cut-outs 105 to be punched out during the extrusion process. This is in marked contrast, both in terms of time and cost, to the prior approach of utilizing a computer numerical control (CNC) machine to fabricate the cut-outs/features after the tower extrusion has been completed.

It will be appreciated that the physical requirements placed on the hydroponic tower depend on the exact nature of its intended use. Some of the use characteristics that impact design requirements include (i) desired tower height, (ii) number of plants per unit length, (iii) expected plant size at maturity and prior to harvesting, (iv) expected weight per plant and corresponding container, (v) intended means used to transfer plants/containers into and out of the tower, (vi) water/nutrient delivery system, etc. The towers disclosed herein are designed to hold a minimum distributed load of 25 pounds over 200 inches for a single-sided tower, and a minimum distributed load of 50 pounds over 200 inches for a dual-sided tower. The hinge and fastener assemblies described below are designed to withstand a 25 pound shear load over a 200 inch length parallel to the front face, and a 45 pound point force perpendicular to the front face.

In general, the cross-section of the tower cavities disclosed herein are selected to be in the range of 1.5 inches by 1.5 inches to 3 inches by 3 inches, where the term "tower cavity" refers to the region within the body of the tower and behind the tower face plate. Preferably wall thickness is within the range of 0.065 to 0.075 inches. A dual-sided hydroponic tower, such as that shown in FIGS. 1 and 2, has two back-to-back cavities, each preferably within the noted size range. It should be understood, however, that the invention is not limited to tower cavities with a particular cross-section or size, and the descriptions provided herein are based on preferred embodiments of the invention and are not meant to limit the scope of the invention.

The strength of the tower depends on the specific tower design which, in large part, depends on the intended crop, the means used to plant and harvest, the intended water/nutrient delivery system, the desired tower-to-tower packing density, etc. As a general guideline, however, the inventors have found that in addition to providing increased packing density and a lower overall tower cost (based on cost per plant), the dual-sided tower has the added benefit of dramatically increasing tower stiffness. To achieve the same stiffness in a single-sided tower without altering wall thickness or cavity size, fins can be added to the back surface of the tower as described and illustrated in co-pending U.S. patent application Ser. No. 15/910,601, filed 2 Mar. 2018, the disclosure of which is incorporated herein by reference for any and all purposes.

Figure 5:
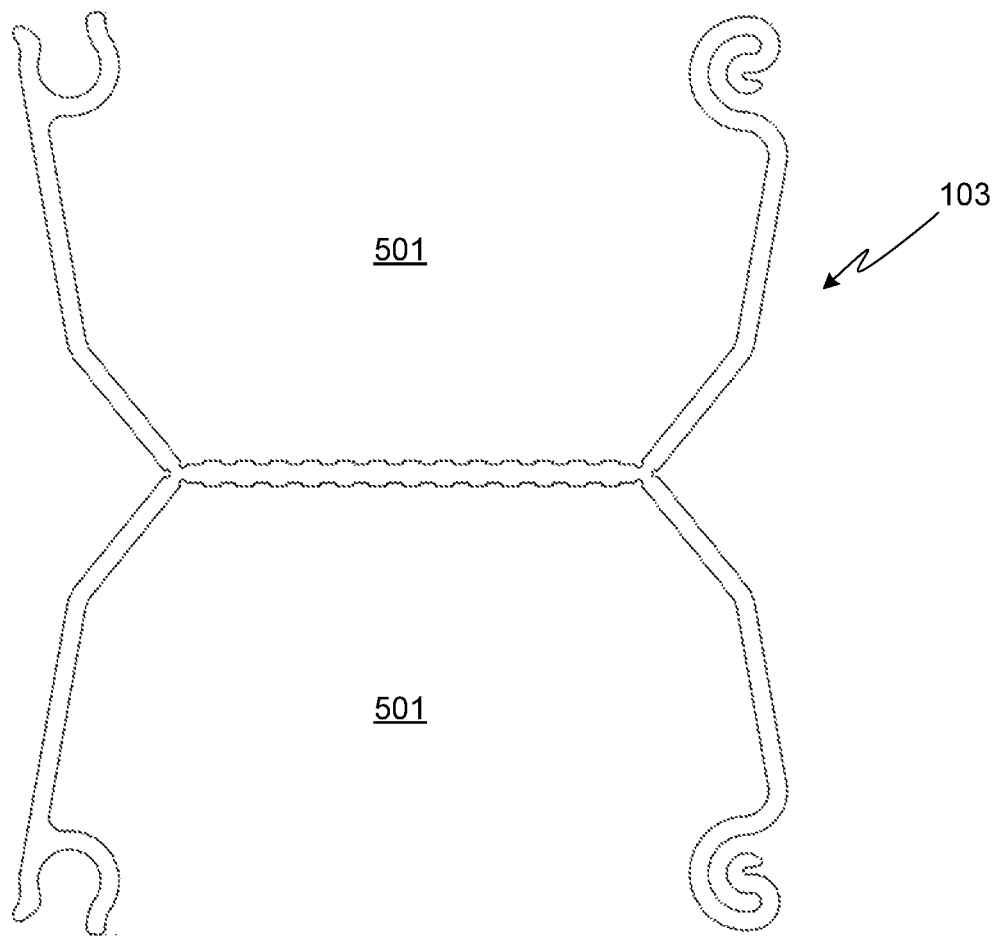
FIG. 5 provides a cross-sectional view of the dual cavity tower body utilized in the tower shown in FIGS. 1 and 2.
Figure 6:
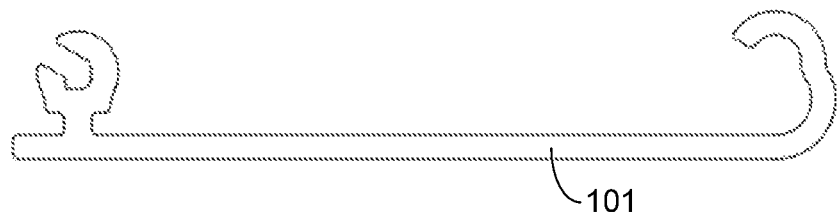
FIG. 6 provides a cross-sectional view of the face plate member utilized in the towers shown in FIGS. 1-4.
Figure 7:
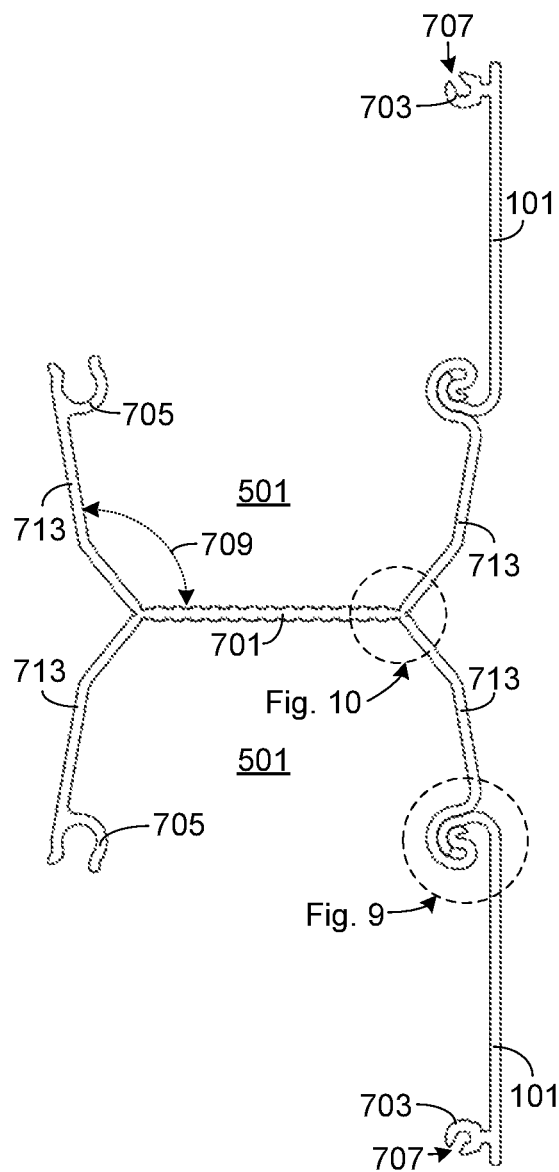
FIG. 7 provides a cross-sectional view of the multi-piece tower assembly shown in FIGS. 1 and 2, this view showing both face plates in the open position.
Figure 8:
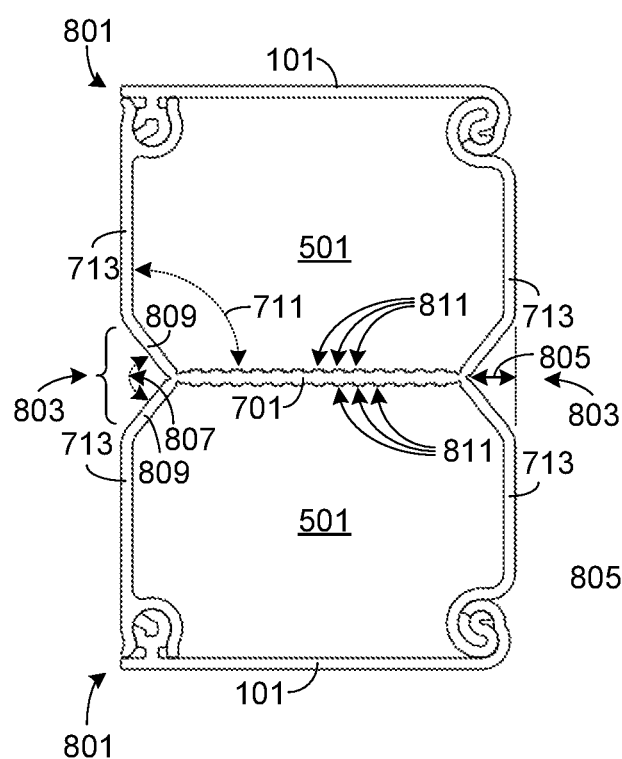
FIG. 8 provides a cross-sectional view of the multi-piece tower assembly shown in FIGS. 1 and 2, this view showing both face plates in the closed position.

FIG. 5 provides a cross-sectional view of tower body 103 while FIG. 6 provides a cross-sectional view of face plate 101. FIGS. 7 and 8 provide cross-sectional views of tower 100 with the face plates in the open and closed positions, respectively. Preferably both the body portion and the face plates are extruded, and features such as cut-outs 105 are punched during the process. Although any of a variety of materials can be used in the manufacture of the tower, preferably both components are fabricated from plastic (e.g., polyethylene, polypropylene, polyvinyl chloride, polytetrafluoroethylene, acrylonitrile butadiene styrene (ABS), etc.), and more preferably from an opaque ABS plastic that is colored white. Using an opaque PVC material that prevents light from entering the tower helps to minimize algae blooms while the white coloring increases the amount of light reflected back onto the plants.

The use of a hinged front face plate has been found by the inventors to simplify tower maintenance in general, and tower cleaning in particular. For example, to clean the tower the face plates are unhinged (i.e., opened) from the body to allow easy access to the body cavity 501. After cleaning, the face plates are closed. Since the face plates remain attached to the tower body throughout the cleaning process, it is easier to maintain part alignment and to insure that each face plate is properly associated with the appropriate tower body and, assuming a double-sided tower body, that each face plate is properly associated with the appropriate side of a specific tower body. Additionally, if the planting and/or harvesting operations are performed with the face plate in the open position, for the dual-sided configuration both face plates can be opened and simultaneously planted and/or harvested, thus eliminating the step of planting and/or harvesting one side and then rotating the tower and planting and/or harvesting the other side.

Figure 9:
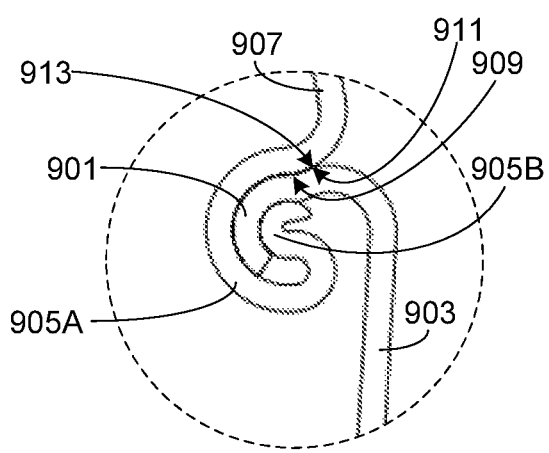
FIG. 9 provides a detailed cross-sectional view of the hinge region of the multi-piece hydroponic tower of the invention.

FIG. 9 provides a detailed cross-sectional view of the preferred embodiment of the hinge. In this embodiment, the end portion 901 of face plate 903 is curved and sized to fit within, and rotate about, the curved end portion of body side wall 907. As shown, the end portion of the side wall is shaped to form two concentric surfaces 905A and 905B. Face plate end portion 901 rotates about and within the space formed by surfaces 905A and 905B. For a typical wall thickness of 0.065 inches, the end portions of both the tower body and the face plate must be elastically deformed during assembly. Once assembled, the face plate cannot be removed from the body without applying excessive force, thus minimizing the risk of accidental disassembly during planting, harvesting and/or tower maintenance.

It will be appreciated that the limitation placed on the maximum opening of the hinged face plate is determined by the specific design of the hinged pieces, i.e., face plate end portion 901 and the curved end portion 905A/905B of the tower body. In the illustrated embodiment, the end portion of the face plate includes a second bend at position 909, resulting in face plate surface 911 contacting tower body surface 913 when the face plate is in the fully open position. In the preferred embodiment, this contact point limits hinge movement such that the plane of face plate 101 is approximately perpendicular to rear cavity surface 701 when the face plate is in the fully open position, and more preferably limits hinge movement such that there is an angle of approximately 86 degrees between the plane of the face plate and that of the rear cavity surface 701 when the hinge is fully open.

Any of a variety of different fastener types can be used to latch face plate 101 to the tower body when the hinge is closed. In the preferred embodiment and as illustrated, fasteners 801 are comprised of snap-fit fasteners. Each snap-fit fastener 801 is comprised of a first portion 703 formed on the face plate at a location distal from face plate end portion 901, and a second portion 705 formed on the edge of the tower body at a location opposite that of hinge end portions 905A/905B. While snap-fit fasteners can utilize a variety of shapes, in the preferred embodiment snap-fit fastener portion 703 is generally cylindrically with body portion 705 having a complimentary shape. Slot 707 in snap-fit portion 703 allows portion 703 to compress more readily during fastening.

In at least one preferred embodiment, the side walls of each tower cavity are tapered, thus ensuring that the tower face plates can open without the plant plug holders clipping the side walls. Preferably the flare out of each side wall is approximately 10 degrees, resulting in an angle 709 of approximately 100 degrees. Note that when the face plate is closed, the side walls are pulled inward such that the angle between the side walls and the rear cavity surface, i.e., angle 711, is approximately 90 degrees (i.e., 90 degrees plus/minus 5 degrees). As a result, when the face plate is closed, the tower cavity 501 has an approximately square or rectangular shape as shown.

Figure 10:
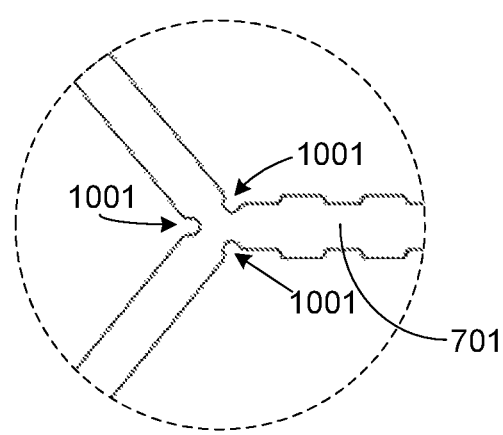
FIG. 10 provides a detailed cross-sectional view of a portion of the dual-sided, multi-piece tower body corresponding to the hydroponic tower illustrated in FIGS. 1 and 2, this view showing the intersection of the cavity rear wall with the cavity side walls.

Due to the difference in cross-section between the open (i.e., FIG. 7) and closed (i.e., FIG. 8) configurations, preferably steps are taken to ensure that cavity side walls do not bow out when the face plates are closed. Preferably and as shown in FIG. 10, the junction 1001 between the rear cavity wall 701 and each side wall has a strain relief feature with a 0.012 inch radius.

As shown in the figures, preferably the dual-sided tower includes a large "V" shaped groove 803 that runs along the length of the tower, and on either side of the tower as shown. Groove 803 is centered on the side of tower, evenly splitting the two tower cavities. Note that in the single-sided configuration (e.g., FIGS. 3 and 4), only half of the groove (e.g., groove 303) is required. In at least one embodiment of the invention utilizing a double-sided configuration (e.g., FIGS. 1 and 2), groove 803 has a depth 805 of approximately 0.35 inches (±0.1 inches). In this embodiment the angle 807 between side wall portions 809 is preferably within the range of 90 to 110 degrees, and more preferably 102 degrees.

Groove 803, or groove 303 in the single-sided configuration, provides an alignment feature that can be used when coupling planters, harvesters, or other equipment to the tower. This is an especially useful feature in an automated system. An additional benefit of groove 803, or groove 303 in the single-sided configuration, is that it reduces the width of rear cavity surface 701. Since water and nutrients are preferably supplied to the plants within the hydroponic tower by directing the water/nutrient flow along surface 701, reducing the width of this surface increases the likelihood that the water and nutrients flowing down the surface reach the plants contained within the tower.

The hydroponic towers of the present invention are not limited to a specific water/nutrient delivery system. Thus, for example, a wicking system may be implemented within the disclosed towers. As noted above, however, in the preferred embodiment the water/nutrient mix is directed towards the cavity rear surface 701 where it can then flow downward, feeding the plants contained in the individual plant containers that are fit into each tower cut-out. In order to help control water/nutrient flow along the back wall of the tower cavity, preferably a series of vertical ridges 811 are fabricated onto the rear cavity wall 701 of each cavity 501. In this embodiment, each ridge 811 is 0.0625 inches wide and extends from the wall surface by 0.012 inches. It will be appreciated that other ridge dimensions can be used, and that the ridges do not have to be uniform across the entire surface, i.e., the ridges in the center could be wider and/or deeper than those to either side of the wall center.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A dual-sided hydroponic tower, comprising:
    a tower body, said tower body defining a first tower cavity and a second tower cavity, said first tower cavity configured to provide a passageway for a water/nutrient mix, said second tower cavity configured to provide a second passageway for said water/nutrient mix, wherein a first edge portion of said tower body includes a first tower body hinge member, said first tower body hinge member of said first edge portion of said tower body corresponding to said first tower cavity, said tower body further comprising a second tower body hinge member corresponding to a second edge portion of said tower body, said second tower body hinge member of said second edge portion of said tower body corresponding to said second tower cavity;
    a first tower face plate, wherein an edge portion of said first tower face plate includes a first face plate hinge member, wherein said first tower face plate is hingeably coupled to said tower body via said first tower body hinge member and said first face plate hinge member, wherein said first tower face plate is positionable relative to said tower body in at least a first tower cavity closed position and a first tower cavity open position, said first tower face plate comprising a first plurality of plant container cut-outs, said first plurality of plant container cut-outs configured to accept a first plurality of plant containers;
    a second tower face plate, wherein an edge portion of said second tower face plate includes a second face plate hinge member, wherein said second tower face plate is hingeably coupled to said tower body via said second tower body hinge member and said second face plate hinge member, wherein said second tower face plate is positionable relative to said tower body in at least a second tower cavity closed position and a second tower cavity open position, said second tower face plate comprising a second plurality of plant container cut-outs, said second plurality of plant container cut-outs configured to accept a second plurality of plant containers;
    at least one of a first fastener configured to temporarily latch said first tower face plate to said tower body when said first tower face plate is in said first tower cavity closed position;
    at least one of a second fastener configured to temporarily latch said second tower face plate to said tower body when said second tower face plate is in said second tower cavity closed position;
    said first tower cavity further comprising a first side wall, a second side wall and a first rear cavity wall, wherein said first side wall flares out relative to said first rear cavity wall when said first tower face plate is positioned in said first tower cavity open position, and wherein said second side wall flares out relative to said first rear cavity wall when said first tower face plate is positioned in said first tower cavity open position; and
    said second tower cavity further comprising a third side wall, a fourth side wall and a second rear cavity wall, wherein said third side wall flares out relative to said second rear cavity wall when said second tower face plate is positioned in said second tower cavity open position, and wherein said fourth side wall flares out relative to said second rear cavity wall when said second tower face plate is positioned in said second tower cavity open position.

2. The dual-sided hydroponic tower of claim 1, said at least one of said first fastener comprising a first plurality of fasteners, and said at least one of said second fastener comprising a second plurality of fasteners.

3. The dual-sided hydroponic tower of claim 1, said at least one of said first fastener comprising at least one of a first snap-fit fastener, and said at least one of said second fastener comprising at least one of a second snap-fit fastener.

4. The dual-sided hydroponic tower of claim 1, wherein said first side wall is at an angle of approximately 100 degrees relative to said first rear cavity wall when said first tower face plate is positioned in said first tower cavity open position, wherein said second side wall is at an angle of approximately 100 degrees relative to said first rear cavity wall when said first tower face plate is positioned in said first tower cavity open position, wherein said third side wall is at an angle of approximately 100 degrees relative to said second rear cavity wall when said second tower face plate is positioned in said second tower cavity open position, and wherein said fourth side wall is at an angle of approximately 100 degrees relative to said second rear cavity wall when said second tower face plate is positioned in said second tower cavity open position.

5. The dual-sided hydroponic tower of claim 1, wherein said first side wall is approximately perpendicular to said first rear cavity wall when said first tower face plate is positioned in said first tower cavity closed position, wherein said second side wall is approximately perpendicular to said first rear cavity wall when said first tower face plate is positioned in said first tower cavity closed position, wherein said third side wall is approximately perpendicular to said second rear cavity wall when said second tower face plate is positioned in said second tower cavity closed position, and wherein said fourth side wall is approximately perpendicular to said second rear cavity wall when said second tower face plate is positioned in said second tower cavity closed position.

6. The dual-sided hydroponic tower of claim 1, further comprising:
    a first strain relief feature positioned at a first junction, said first junction formed between said first side wall and said first rear cavity wall;
    a second strain relief feature positioned at a second junction, said second junction formed between said second side wall and said first rear cavity wall;
    a third strain relief feature positioned at a third junction, said third junction formed between said first side wall and said second side wall;
    a fourth strain relief feature positioned at a fourth junction, said fourth junction formed between said third side wall and said second rear cavity wall;

a fifth strain relief feature positioned at a fifth junction, said fifth junction formed between said fourth side wall and said second rear cavity wall; and a sixth strain relief feature positioned at a sixth junction, said sixth junction formed between said third side wall and said fourth side wall.

7. The dual-sided hydroponic tower of claim 1, further comprising:
a first plurality of vertical ridges formed on a first rear cavity wall, said first rear cavity wall corresponding to said first tower cavity; and
a second plurality of vertical ridges formed on a second rear cavity wall, said second rear cavity wall corresponding to said second tower cavity.

8. The dual-sided hydroponic tower of claim 7, said first plurality of vertical ridges of uniform width, and said second plurality of vertical ridges of uniform width.

9. The dual-sided hydroponic tower of claim 1, said tower body and said first tower face plate and said second tower face plate each fabricated from a plastic material.

10. The dual-sided hydroponic tower of claim 9, said plastic material selected from the group consisting of polyethylene, polypropylene, polyvinyl chloride, polytetrafluoroethylene, and acrylonitrile butadiene styrene.

11. The dual-sided hydroponic tower of claim 9, wherein said plastic material is white.

12. A dual-sided hydroponic tower, comprising:
a tower body, said tower body defining a first tower cavity and a second tower cavity, said first tower cavity configured to provide a passageway for a water/nutrient mix, said second tower cavity configured to provide a second passageway for said water/nutrient mix, wherein a first edge portion of said tower body includes a first tower body hinge member, said first tower body hinge member of said first edge portion of said tower body corresponding to said first tower cavity, said tower body further comprising a second tower body hinge member corresponding to a second edge portion of said tower body, said second tower body hinge member of said second edge portion of said tower body corresponding to said second tower cavity;

a first tower face plate, wherein an edge portion of said first tower face plate includes a first face plate hinge member, wherein said first tower face plate is hingeably coupled to said tower body via said first tower body hinge member and said first face plate hinge member, wherein said first tower face plate is positionable relative to said tower body in at least a first tower cavity closed position and a first tower cavity open position, said first tower face plate comprising a first plurality of plant container cut-outs, said first plurality of plant container cut-outs configured to accept a first plurality of plant containers;

a second tower face plate, wherein an edge portion of said second tower face plate includes a second face plate hinge member, wherein said second tower face plate is hingeably coupled to said tower body via said second tower body hinge member and said second face plate hinge member, wherein said second tower face plate is positionable relative to said tower body in at least a second tower cavity closed position and a second tower cavity open position, said second tower face plate comprising a second plurality of plant container cut-outs, said second plurality of plant container cut-outs configured to accept a second plurality of plant containers;

at least one of a first fastener configured to temporarily latch said first tower face plate to said tower body when said first tower face plate is in said first tower cavity closed position;

at least one of a second fastener configured to temporarily latch said second tower face plate to said tower body when said second tower face plate is in said second tower cavity closed position;

a first V-shaped groove running along the length of a first side of said tower body, said first V-shaped groove centered between said first tower cavity and said second tower cavity; and a second V-shaped groove running along the length of a second side of said tower body, said second V-shaped groove centered between said first tower cavity and said second tower cavity.

13. The dual-sided hydroponic tower of claim 12, said first V-shaped groove formed from a first side wall portion corresponding to said first tower cavity and a second side wall portion corresponding to said second tower cavity; and
said second V-shaped groove formed from a third side wall portion corresponding to said first tower cavity and a fourth side wall portion corresponding to said second tower cavity.

14. The dual-sided hydroponic tower of claim 13, further comprising:
a first strain relief feature positioned at a first junction, said first junction formed between said first side wall portion and a first rear cavity wall;
a second strain relief feature positioned at a second junction, said second junction formed between said second side wall portion and said first rear cavity wall;
a third strain relief feature positioned at a third junction, said third junction formed between said first side wall portion and said second side wall portion;
a fourth strain relief feature positioned at a fourth junction, said fourth junction formed between said third side wall portion and a second rear cavity wall;
a fifth strain relief feature positioned at a fifth junction, said fifth junction formed between said fourth side wall portion and said second rear cavity wall; and
a sixth strain relief feature positioned at a sixth junction, said sixth junction formed between said third side wall portion and said fourth side wall portion.

15. The dual-sided hydroponic tower of claim 13, wherein said first side wall portion is at an angle of between 90 and 110 degrees relative to said second side wall portion when said first tower face plate is in said first tower cavity closed position and said second tower face plate is in said second tower cavity closed position, and wherein said third side wall portion is at an angle of between 90 and 110 degrees relative to said fourth side wall portion when said first tower face plate is in said first tower cavity closed position and said second tower face plate is in said second tower cavity closed position.

16. The dual-sided hydroponic tower of claim 15, wherein said first side wall portion is at an angle of approximately 102 degrees relative to said second side wall portion when said first tower face plate is in said first tower cavity closed position and said second tower face plate is in said second tower cavity closed position, and wherein said third side wall portion is at an angle of approximately 102 degrees relative to said fourth side wall portion when said first tower face plate is in said first tower cavity closed position and said second tower face plate is in said second tower cavity closed position.

17. The dual-sided hydroponic tower of claim 12, said at least one of said first fastener comprising a first plurality of fasteners, and said at least one of said second fastener comprising a second plurality of fasteners.

18. The dual-sided hydroponic tower of claim 12, said at least one of said first fastener comprising at least one of a first snap-fit fastener, and said at least one of said second fastener comprising at least one of a second snap-fit fastener.

19. The dual-sided hydroponic tower of claim 12, further comprising:
   a first plurality of vertical ridges formed on a first rear cavity wall, said first rear cavity wall corresponding to said first tower cavity; and
   a second plurality of vertical ridges formed on a second rear cavity wall, said second rear cavity wall corresponding to said second tower cavity.

20. The dual-sided hydroponic tower of claim 19, said first plurality of vertical ridges of uniform width, and said second plurality of vertical ridges of uniform width.

* * * * *